Jan. 26, 1971 R. A. ONANIAN 3,558,169

RECORD HANDLING DEVICE

Filed July 29, 1968 2 Sheets-Sheet 1

INVENTOR.
RICHARD A. ONANIAN
BY Robert T. Dunn
ATTORNEY

INVENTOR.
RICHARD A. ONANIAN
BY Robert T Dunn
ATTORNEY

United States Patent Office 3,558,169
Patented Jan. 26, 1971

3,558,169
RECORD HANDLING DEVICE

Richard A. Onanian, 105 Wildwood Ave., Arlington, Mass. 02174

Filed July 29, 1968, Ser. No. 748,276
Int. Cl. B65g 7/12
U.S. Cl. 294—16 10 Claims

ABSTRACT OF THE DISCLOSURE

A device for picking up individual phonograph records from a stack of records and for holding the selected record so that the fingers do not touch the playing surface of the record, consists of a fold of rigid material which defines an open envelope the two sides of which are not in registry so that each does not cover the other and as a result a portion of each side extends beyond the edge of the other side. The extending portion of each side of the fold, called a tab, tapers to a knife-like edge so that one tab can readily be placed along the top edge of a selected record, then the holder is turned so that the other tab slides under the selected record and the holder is then pushed onto the record until the edge of the record abuts the back of the holder.

The present invention relates to devices for selecting and holding disc-like objects from a stack of such objects so as to facilitate the handling of the disc-like objects and particularly for removing one such disc from a stack.

The principal object of the present invention is to provide a simple inexpensive device for handling phonograph records so that the fingers need not touch the playing surface of the record. It is within the purposes of the invention to provide such a device which can be easily manipulated by one hand for selecting a single record from a stack of records by a simple manipulation of the device and then carrying the selected record from the stack by holding the record with the device so that the fingers do not touch the playing surfaces of the record. In addition, it is desirable that the holder be readily stored on a record or on the stiff cardboard envelope in which phonograph records are usually packaged. It is also desirable that the device be capable of attachment to the record or the record envelope and yet add negligible protuberance and weight when so attached. This being accomplished, the holders could be attached to the record envelopes which could then be stored in any of the currently popular fashions for storing records and with portions of the holding device visible while the record is in storage so that markings on the holder which identify the record can be seen and staggered at will to facilitate filing.

It is a further object of the present invention to provide a record holding device having all of the above enumerated advantageous qualities.

Other objects of the present invention and structural features of embodiments of the invention will be evident from the following specific description taken in conjunction with the figures in which.

Figure 1:
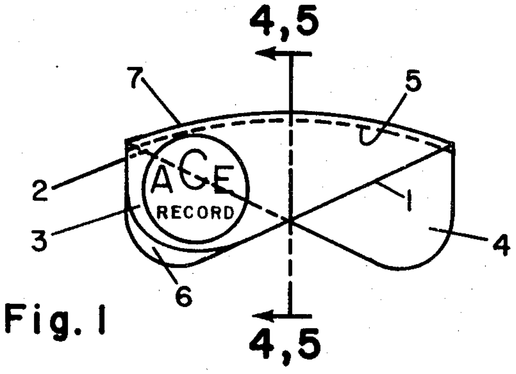
FIGS. 1, 2 and 3 are front, top and side views of a record selector-holder made of a single unitary piece and incorporating features of the present invention.

An embodiment of the invention is formed of a single unitary piece of relative stiff material which can be worked in such a manner that when it is molded to form an open envelope the two sides of the envelope define a slot, the sides of which are relatively stiff. Such an embodiment is illustrated in FIG. 1 and may be molded in one piece. It may also be formed from a piece of plastic, paper or metal having a parallelogram-like shape which is folded along a diagonal line and then worked to curve the fold line so that the two sides 1 and 2 extending from the curved fold only partially overlap each other and substantial portions of each, called herein tabs 3 and 4, are not overlapped by the opposing side just as one would expect from folding a parallelogram or rectangle along a diagonal. In all embodiments, the fold line is curved or turned having a radius of curvature substantially equal to the radius of the phonograph records with which the holder is used. This curved line is represented by line 5 which defines the back of the holder as viewed in FIG. 1.

Figure 2:
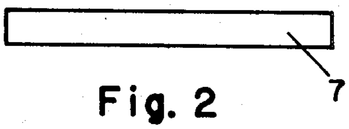
Figures 3, 4, 5:
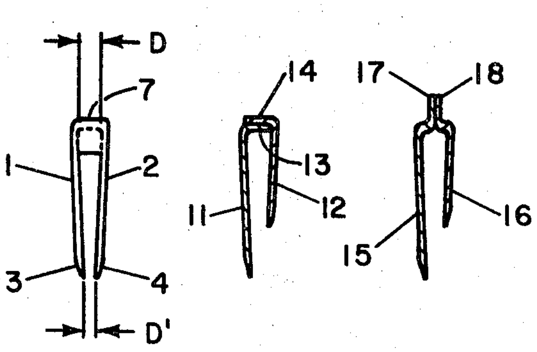
FIGS. 4 and 5 are side sectional views illustrating techniques for constructing such a holder in two pieces.

FIGS. 2 and 3 show top and side views of the same holder revealing the sides 1 and 2 which end in tabs 3 and 4, respectively. Each of the tabs is preferably tapered at its end defining a knife edge such as edge 6 on tab 3 and it is generally preferred that the tabs be closer together than the overlapping part of the sides 1 and 2 and that the back 7, defined by line 5, be sufficiently wide to define a dimension D that is at least equal to the thickness of the record which with the holder is used. This dimension D sets the spacing between the sides 1 and 2 at the back 7 and preferably diminishes toward the tabs 3 and 4 which are separated by the dimension D'.

The thickness of each of the tabs 3 and 4 may be decreased in moving along a tab toward the end of the tab. Thus, the tab becomes more flexible towards the end. The knife edge 6 formed along the edge of each tab provides a thin edge by which to select a record from a stack as described below with reference to FIGS. 6 to 9.

The holder shown in FIGS. 1, 2 and 3 is designed to be molded plastic well-known injection molding techniques. It may also be fabricated of a single sheet of material which may be metal or plastic or anything else which is sufficiently stiff and resilient and will retain its shape sufficiently to be used as described herein. For example, it may be made of a stiffened paper product or a stiffened fabric material which is first cut into a rectangular or parallelogram-like shape with two opposite corners rounded as the tabs 3 and 4 are rounded, and then folded along a diagonal and worked to curve the fold line like line 5, this being accomplished in such a manner as to fix the fold so that the two sides thereof remain in the folded position and tend to return to the folded position when bent therefrom. The holder may also be formed in two separate pieces one substantially defined as side 1 and tab 3 and the other as side 2 and tab 4 which are joined together as illustrated in FIG. 4 or 5. FIG. 4 is a side sectional view of a holder very similar to the one shown in FIGS. 1 to 3, but formed in two separate pieces which are joined together. One piece 11 has the shape of side 1 and tab 3 while the other piece 12 has the shape of side 2 and tab 4. The pieces 11 and 12 are joined along overlapping portions 13 and 14 as shown in FIG. 4 which define a line equivalent to line 5. For example, pieces 11 and 12 may be formed of stiff material and fastened together by an adhesive at their overlapping portions 13 and 14.

FIG. 5 is a side sectional view of still another embodiment in which the holder is formed of two pieces. The one piece 15 is equivalent to side 1 and tab 3 and the other piece 16 is equivalent to side 2 and tab 4. Each of these is equipped with a step which defines a line equivalent to line 5 and a strip portion extending beyond the step. The strip portions on the pieces 15 and 16 are strips 17 and 18 at which the pieces are joined together as shown in FIG. 5 employing an adhesive or any other suitable technique for joining. For example, they may be joined by crimping, stapling, riveting, fusing, etc.

Figures 6, 7, 8, 9:
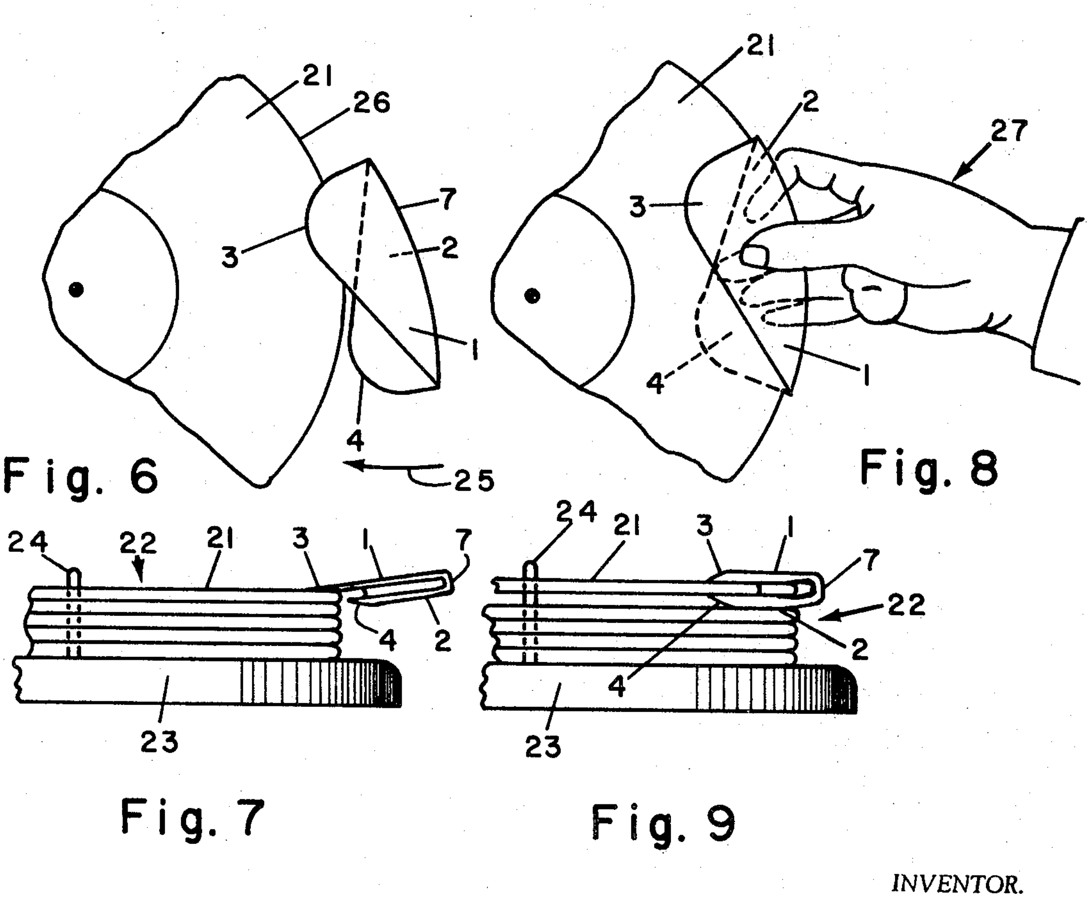
FIGS. 6 and 7 are top and front views illustrating use of a holder to pick up the top record from a stack on a spindle.
FIGS. 8 and 9 are similar top and front views showing the holder attached to the record.

FIGS. 6 to 9 illustrate use of the selector-holder such as described above by which an operator selects the top record from a stack on a spindle and then picks up the record without touching it with his fingers. The operator inserts the tab 3 along the top edge of the record 21 in the stack of records 22 on a turntable 23 and spindle 24 as shown in FIGS. 6 and 7. Then the operator rotates the holder about the tab 3 in the direction of arrow 25 so that the tab 4 slides under the record 21 as shown in FIGS. 8 and 9. The operator then pushes the holder over the record until the edge 26 of the record abuts the back 7 of the holder. Clearly the operator 27 can then carry the selected record 21 without touching the playing surface of the record or without touching any part of the record for that matter. The size and shape of the holder permit comfortable gripping between the thumb and fingers.

Figure 10:
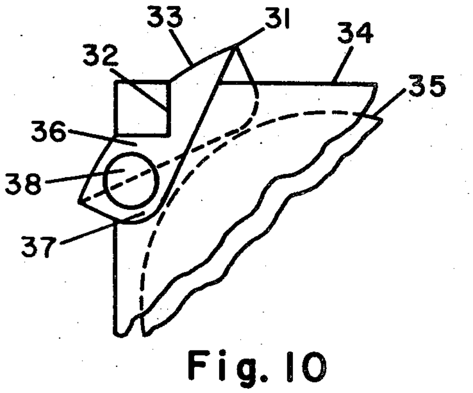
FIG. 10 shows an embodiment of the holder attached to the corner of the record envelope for storage.

FIG. 10 illustrates another embodiment in which the holder 31, constructed as described above with reference to any of the figures has a V cut 32 through the back extending inward from the fold line 33. This permits the holder 31 to be stored by clipping it to the corner of the cardboard envelope 34 in which record 35 is normally stored or packaged. When the holder such as 31 is kept in this manner at the corner of the record envelope, portions of the holder conveniently projects. One projecting portion consists of the side 36 and tab 37 of the holder 31 on which an identification 38 of the record may be made and so the record in its envelope can be stored with this identification conveniently located at a corner of the storing envelope.

Figure 11:
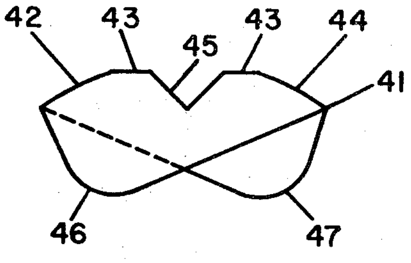
Figure 12:
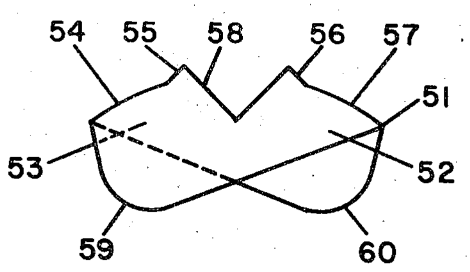

When the holder is molded or formed with a curved back as described above with reference to FIG. 1, there is a tendency for the tabs 3 and 4 to stay closed; that is the tabs 3 and 4 will tend to appear from the side as shown in FIG. 3 spaced closer together (dimension D') than the spacing at the back 7 (dimension D). If line 5 were a straight line, this tendency would be less and as the holder was repeatedly used the two tabs would be caused to curl outward and so in time they would appear from the side to be separated more than the dimension D. This tendency of the tabs to stay closed accomplished by curving the back or fold to define a line such as line 5, can also be accomplished as illustrated in FIGS. 11 and 12 by forming the back along a line which changes direction. In FIG. 11 the holder 41 is constructed with the back fold defining three straight lines 42, 43 and 44. Then a V cut 45 may be made so that this holder can be stored as holder 31 in FIG. 10. The abrupt change in the back line along the lines 42, 43 and 44 has a tendency to cause the tabs 46 and 47 to stay closed as viewed from the side just at the tabs 3 and 4 appear closed in FIG. 3.

Another way of accomplishing this same thing is illustrated in FIG. 12 where the holder 51 can be conveniently molded or formed of two pieces after the fashion described above with references to FIGS. 4 and 5. These two pieces 52 and 53 are fastened together along lines 54, 55, 56 and 57 by an adhesive or some mechanical fasteners, and then a V cut 58 is made to permit the use shown in FIG. 10. Here again, the line defined by the back of the holder abruptly changing direction along lines 54 to 57 and this causes the tabs 59 and 60 to tend to stay closed as viewed from the side.

Figure 13:
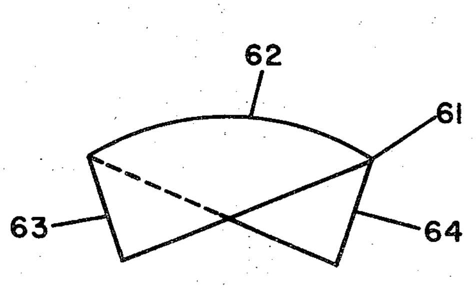
FIGS. 11, 12 and 13 illustrate other configurations of the holder.

The holder 61 in FIG. 13 is made by folding a sheet of suitable plastic or metal which has the shape of a parallelogram, along a diagonal which extends between the two closest spaced opposite corners of the parallelogram and then working the fold to form the curved back 62. The tabs 63 and 64 which result can be rounded at their ends for the comfort of the user.

Figure 14:
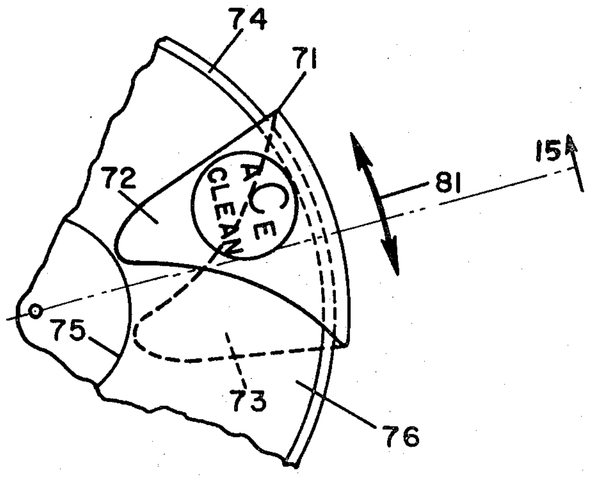
FIGS. 14 and 15 are top and edge views illustrating use of a holder design for selecting, holding and cleaning the playing surface of a record.
Figure 15:
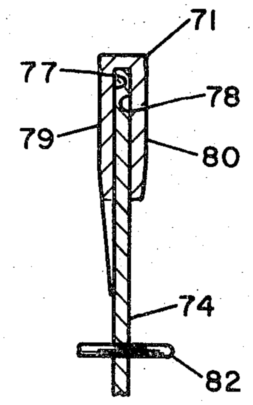

The sides of the holder can be made sufficiently deep so that when it is inserted over the edge of a record the tabs extend to the inside edge of the playing portion of the record. Such a holder can be coated on the inside with a surface for cleaning the record and then used not only to select and hold a record, but also to clean it. This is illustrated in FIGS. 14 and 15. The holder 71 has tabs 72 and 73 which extend over the record 74 all the way to the inner edge 75 of the playing portion 76 of the record. The inside surfaces 77 and 78 of the sides 79 and 80 of the holder are coated throughout with a material suitable for cleaning the playing portion of a record. Thus, when the holder 71 is inserted over the record as shown in FIG. 14 and then moved around the record in the directions of arrow 81 the inside cleaning surfaces 77 and 78 will clean the playing portion of the record. This can be accomplished when the record is on a spindle 82 or after the record is removed from the spindle.

The various mechanical uses of the record selector holder and cleaner described herein are but a few of the advantageous uses. The record holder is also useful for displaying advertising or may be personalized to identify the owner of the record or may identify the particular record to which it is attached as described with reference to FIG. 10. The cost of the holder is slight particularly when compared to its considerable utility. A holder of any of the designs described herein could be included with each phonograph record purchased and be located on or inside the cardboard envelope in which such records are usually packaged. Embodiments shown and described herein and the uses described are but a few of many which are within the scope of the invention as set forth in the accompanying claims.

What is claimed is:

1. A device for selecting and holding flat objects which may have disc-like edges comprising, an open envelope formed of relatively stiff material, the envelope having one edge thereof at least partially closed and the opposite edge substantially completely open, the envelope being defined by two sides which are triangular-like in shape and having one relatively short and two relatively long edges, said two sides joined along a similar long edge with the two short edges on opposite ends of the juncture, the portions of the sides bordered by the short edges defining tabs, either of which can be placed against one side of the disc-like object at the edge thereof, the holder then rotated about said one tab until the other tab is against the opposite side of the disc-like object at which event the holder will have engaged the edge of the object sufficiently to adhere thereto.

2. A holder as in claim 1 and which is formed of a single unitary piece of sheet material having four identifiable corners and which is formed in a fold along a curved line running between opposite corners thereby forming said envelope, sides and tabs.

3. A holder as in claim 1 and which is formed by joining along a line which changes direction, two separate pieces which form said sides and tabs.

4. A holder as in claim 1 and in which said closed edge is open along substantially the middle thereof so that the holder fits over the corner of a flat object with said corner projecting into the open edge of the holder and through the open portion of the holder closed edge.

5. A holder as in claim 1 and in which each of the tabs tends to bend toward the opposite side so that when the holder is inserted over the edge of the flat object, the tabs tend to grip the object from opposite sides of the object.

6. A holder as in claim 5 for holding a phonograph record, the inside of the sides and tabs being sufficiently soft so as not to damage the playing portion of the record.

7. A holder as in claim 6 made of a plastic material which is sufficiently stiff to maintain its shape after repeated use such as set forth herein.

8. A holder as in claim 1 and in which said closed edged thereof defines at least two separate lines which are pivot lines from which the two sides of the holder flex due to forces which tend to separate the two sides at the open edge of the holder, these lines being along directions which are sufficiently abrupt one to the other that the tabs of the holder tend to close after the two sides are separated.

9. A holder as in claim 1 and in which at least a portion of the inside of at least one of the two sides is coated with a material suitable for cleaning the flat object.

10. A holder as in claim 6 and in which the inside of at least one of said sides is at least partially coated with a material suitable for cleaning the playing surface of the record.

References Cited

UNITED STATES PATENTS 3,410,592 11/1968 Schweizer ------------ 294—16

ANDRES H. NIELSEN, Primary Examiner